US006931412B2

(12) United States Patent
Uyttendaele et al.

(10) Patent No.: US 6,931,412 B2
(45) Date of Patent: Aug. 16, 2005

(54) EXTENSIBLE ACTIONS AND CONTAINER TYPES IN AN EXTENSIBLE SCENE GRAPH SYSTEM

(75) Inventors: Matthew T. Uyttendaele, Seattle, WA (US); Andrew L. Bliss, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 10/010,698

(22) Filed: Nov. 5, 2001

(65) Prior Publication Data

US 2002/0083314 A1 Jun. 27, 2002

Related U.S. Application Data

(60) Provisional application No. 60/258,845, filed on Dec. 21, 2000.

(51) Int. Cl.[7] ............................................... G06F 17/30
(52) U.S. Cl. ............................. 707/101; 6/103 R; 6/10
(58) Field of Search ............................... 707/100, 101, 707/103 R, 6, 2, 1

(56) References Cited

U.S. PATENT DOCUMENTS

| | | | | |
|---|---|---|---|---|
| 5,615,363 A | * | 3/1997 | Jenness | 707/103 R |
| 5,751,914 A | * | 5/1998 | Coley et al. | 706/47 |
| 5,873,081 A | * | 2/1999 | Harel | 707/3 |
| 6,292,797 B1 | * | 9/2001 | Tuzhilin et al. | 707/6 |
| 6,308,181 B1 | * | 10/2001 | Jarvis | 707/102 |
| 6,324,550 B1 | * | 11/2001 | Huetter | 707/206 |
| 6,513,040 B1 | * | 1/2003 | Becker et al. | 707/10 |

OTHER PUBLICATIONS de Watering, H., "Javra: a simple, extensible java package for VRML," *Proc. Computer Graphics Int'l*, 2001, 4 pages.
Hopcroft, J.E., et al., "A case study of flexible object manipulation," *Intn'l J. Robotics Res.*, Feb. 1991, 41–50.
McIntyre, D.W., et al., "The design and implementation of sunpict, a user-extensible visual environment for intermediate-scale procedural programming," *Advances in Human Factors/Ergonomics*, 12B, 1989, 339–345.
Miyagi, T., et al., "Realistic image generation using model driven processing in an interactive system," *SPIE*, Feb. 11–14, 1997, vol. 3012, 374–388.

* cited by examiner

*Primary Examiner*—Jean M. Corrielus
(74) *Attorney, Agent, or Firm*—Woodcock Washburn LLP

(57) ABSTRACT

A directed graph includes a plurality of containers, where each container has a type value and is instantiated based on one of a plurality of container types. Each action as instantiated includes an action method table comprising a plurality of action methods. Each action when traversing the directed graph employs the type value of an encountered container as an offset into the action method table thereof to select the action method to be executed on the encountered container. During run-time and prior to traversing the directed graph, an action is instantiated if not already instantiated, and the method table of the action is expanded and filled in based on any new container types in the system.

20 Claims, 9 Drawing Sheets

| INFORMATION OBJECT 30 | |
|---|---|
| PROPERTY | DESCRIPTION |
| GUID | GLOBALLY UNIQUE IDENTIFIER |
| NAME | TYPE NAME (DESCRIPTIVE) |
| RUN TIME ID | SYSTEM-ASSIGNED ID |
| TYPE | SYSTEM TYPE (CONTAINER 12, ACTION 14, ETC.) |
| ANCESTOR | POINTER TO ANCESTOR TYPE INFO |
| DERIVED | TABLE INFO POINTERS FOR ANY DERIVED TYPES |
| CLASS FACTORY | POINTER TO CLASS FACTORY WHICH INSTANTIATES THE TYPE |

LIBRARY 28

EXTENSIBLE ACTIONS AND CONTAINER TYPES IN AN EXTENSIBLE SCENE GRAPH SYSTEM

CROSS-REFERENCE TO RELATED APPLICATION

This application claims the benefit of U.S. Provisional Application No. 60/258,845, filed Dec. 21, 2000 and entitled "EXTENSIBLE ACTION AND CONTAINERS IN THE MICROSOFT EXTENSIBLE SCENE GRAPH", hereby incorporated by reference in its entirety. This application is related to U.S. patent application Ser. No. 09/681,072, filed Dec. 20, 2000, and entitled "CHAINING ACTIONS FOR TRAVERSAL OF A DIRECTED GRAPH", hereby incorporated by reference in its entirety.

TECHNICAL FIELD

The present invention relates to a system for implementing a directed acyclic graph constructed from containers and having actions performed thereon. More specifically, the present invention relates to such system wherein the container types and actions are extensible and wherein the extensible container types and actions inherit properties absent such properties being specifically defined.

BACKGROUND OF THE INVENTION

A directed graph such as a directed acyclic graph may be employed by an application to represent a collection of data. For example, in at least some applications that are visually oriented, a 'scene' that is to be rendered by the application is organized by the application in the form of such a directed graph. For example, if the scene includes a room with a person in the room, the directed graph may include a root node or container at a first level and a person description node and room description node at the second level. At the third level and directly below the person node may be a head node, body node, and limb nodes for the person, each of which variously further defines body parts of the person. Likewise, at the third level and directly below the room node may be a plurality of wall nodes, each of which variously further defines walls within the room. As may be appreciated, further levels of nodes may be provided to even further define elements of the scene in a progressively more detailed manner. It is not atypical that a directed graph may have on the order of thousands of nodes, for example.

Thus, the directed graph defines every element of the scene such that each element is available for rendering a particular view within the scene. Notably, a particular view need not necessarily include every element within the scene/node within the directed graph. For example, in 'looking' in a particular direction, one or more walls of the room of the scene may not be 'visible'. Likewise, depending on the granularity of the view, more finely detailed elements may or may not be discernible. For example, if the person is seen from afar in the view, the fingers of such person are not especially noticeable.

As may now be appreciated, then, to construct a view based on the directed graph, one or more actions are performed with regard to the directed graph to produce a cumulative effect. For example, one action may be to cull out nodes or containers of the graph that would not be visible based on the view looking in a particular direction. Another action may be to cull out nodes or containers of the graph that would not be visible based on being too finely detailed. A further action may be to actually draw the view based on the nodes or containers remaining after the culling action.

In general, to perform an action with regard to a directed graph, the directed graph is traversed and a method related to the action is applied to each node/container, where the method applied is based on the type of node/container. Typically, the traversal begins at the first level of the directed graph, and all 'children' of a node (i.e., (n)th level nodes depending from an (n−1)th level node) are dealt with prior to dealing with any 'siblings' of a node (i.e., nodes at the same (n)th level and all depending from an (n−1)th level node). Note, though, that traversal may also be accomplished based on any other methodology without departing from the spirit and scope of the present invention. Since the action method applied is specific to the type of node/container, the result of the action on any particular node/container depends on such type of node/containers and therefore can be radically different from container to container.

Typically, a core system provides the basic container types required to describe a scene and provides the basic actions to be performed on the graph/scene. Such basic actions may for example include drawing, computing the bounds, and writing data to a file. Such basic container types may for example include links, switches, and shapes. As may be appreciated, though, such a core system cannot anticipate all the types of actions and container types that might be required to implement desired functionality for a particular application.

Accordingly, a need exists for a mechanism to extend the functionality of the core system. In particular, a need exists for an extension mechanism that allows new container types to work with existing actions without having to re-develop such actions, and also that allows new actions to work with existing container types without having to re-develop such container types.

With such extension mechanism, the system can take on additional functionality as required. For example, the system can implement new hardware and software features and algorithms, and can support new hardware and software, all without the system being upgraded to a new version. The system thus has a high degree of fine-grained extensibility to for example allow hardware vendors to replace particular behaviors of objects and to allow software developers and customers to replace and extend algorithms where they have more knowledge to achieve their own differentiation and superior results. This requires the ability to add new/extended container types to the system with new user-defined data and behaviors, and to add new/extended actions to the system with new user-defined action methods. Moreover, this requires that existing container types support new actions, and that existing actions support new container types.

SUMMARY OF THE INVENTION

The aforementioned need is satisfied by the present invention in which a method is provided in combination with a system having a plurality of actions available for traversing a directed graph. The directed graph includes a plurality of containers, where each container has a type value and is instantiated based on one of a plurality of container types. Each action as instantiated includes an action method table comprising a plurality of action methods. Each action when traversing the directed graph employs the type value of an encountered container as an offset into the action method table thereof to select the action method to be executed on the encountered container.

The method checks an action during run-time and prior to traversing the directed graph therewith. In the method, it is determined whether an action must be instantiated, and if so, the action is in fact instantiated during run-time. It is also determined whether the action method table of the action must be expanded and filled in based on any new container types in the system, and if so, the action method table of the action is in fact expanded and filled in during run-time. The action may then be employed to traverse the directed graph.

To instantiate the action, a run-time information library is queried for information on the instantiating action. The information includes the parent action of the instantiating action and the specific action methods associated with the instantiating action. The action is then instantiated based on such information.

In particular, it is ensured that the parent action to the instantiating action is instantiated, and the action method table of the parent action is copied and employed as the action method table of the instantiating action. Appropriate ones of the action methods in the copied method table are then updated to be the specific action methods associated with the instantiating action based on the information obtained from the run-time information library. At least some of the action methods in the action method table of the instantiating action are not updated and thus are action methods inherited from the parent action.

To expand and fill in the action method table of the action, it is determined how many new container types have been added, and the action method table of the action of interest is expanded a corresponding number of entries. A run-time information library is queried for information on each added container type and the action of interest. The information includes the parent action of the action of interest and a specific action method of each added container type if any with regard to the action of interest. The expanded entries of the action method table of the action of interest are then filled in based on such information.

In particular, it is ensured that the parent action to the action of interest is expanded and filled in, and the corresponding entries from the action method table of the parent action are copied and employed as the corresponding entries in the action method table of the action of interest. Appropriate ones of the action methods in the copied entries in the action method table are then updated to be the specific action methods associated with the added container types if any based on the information obtained from the run-time information library. Action methods in the copied entries of the action method table of the action of interest that are not updated are action methods inherited from the parent action.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 4 is a block diagram showing the structure of an information object that may represent the action of FIG. 3 or the container type of FIG. 7 in a run-time information library in accordance with one embodiment of the present invention;

DETAILED DESCRIPTION OF THE INVENTION

Computer Environment

Figure 1:
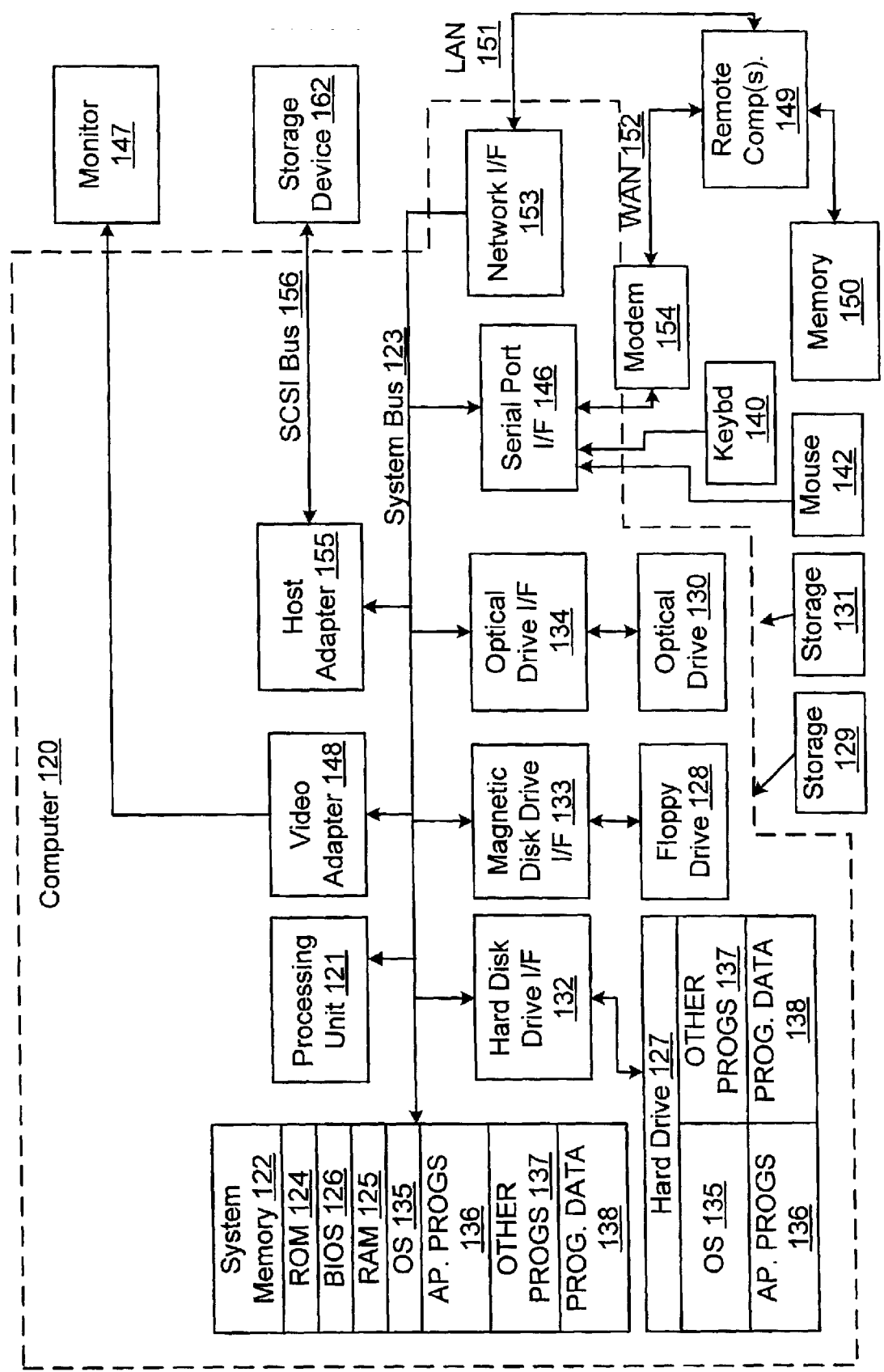
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

In the prior art, and as was discussed above, an action is performed by traversing a directed graph and executing an action-specific method at each container or node. The execution of the method can be container-specific and is done by calling through a table of function pointers for the action. That is, each container has a particular type, and the type of container defines which method is executed in connection with a particular action with respect to the container. Typically, the container type is or includes a numerical value that is employed as an offset within a method table associated with the action. The method table at each entry thereof therefore contains a pointer to the actual code for implementing the method.

Figure 2:
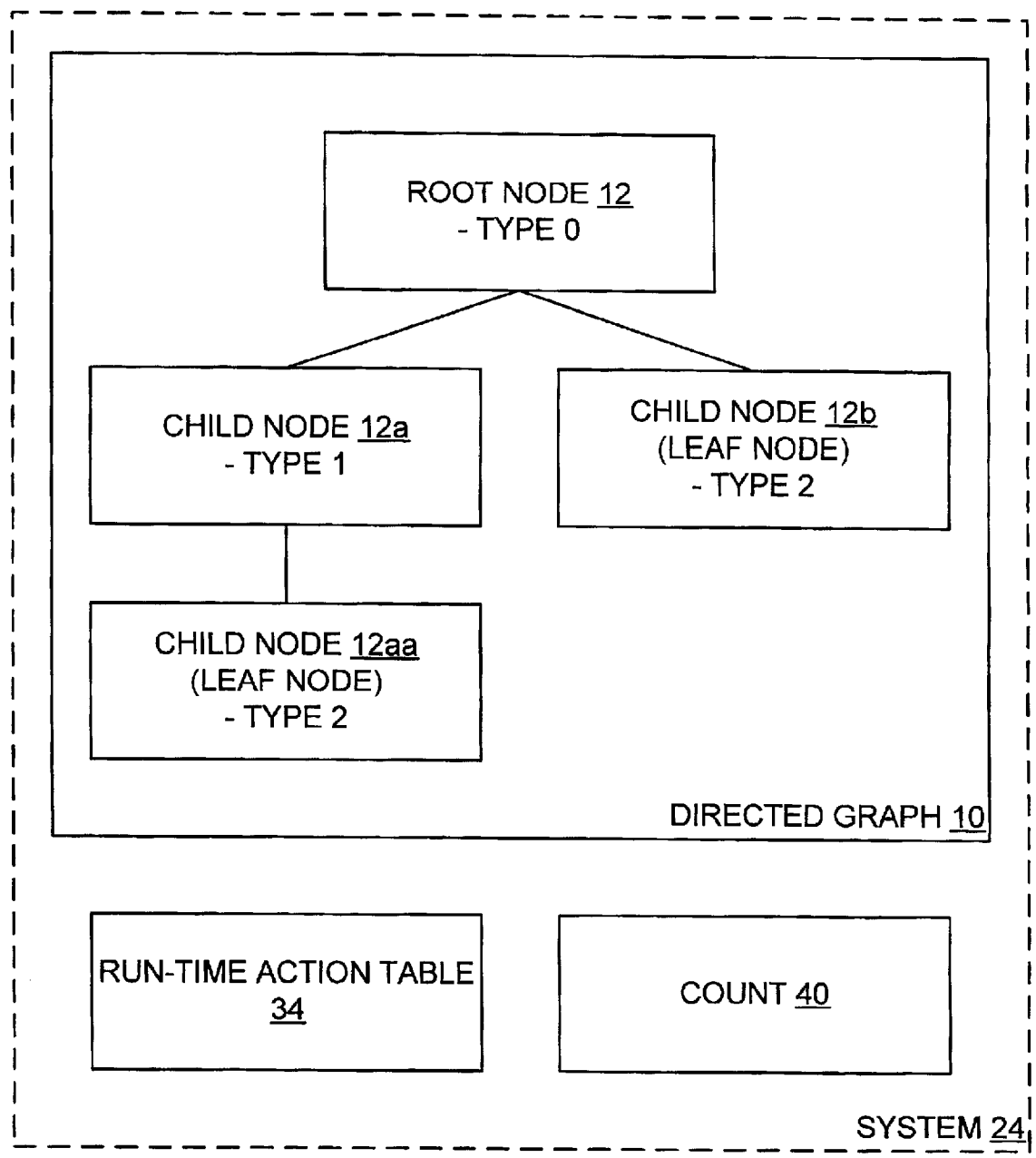
FIG. 2 is a block diagram showing the structure of a directed graph such as that which is traversed in connection with the present invention.

Referring to the drawings in details, wherein like numerals are used to indicate like elements throughout, there is shown in FIG. 2, a directed graph 10 such as that which may be traversed in accordance with the present invention. As discussed above, the directed graph 10 may be a directed acyclic graph such as that which is employed by an application to represent a collection of data. The graph has a root node or container and subsequent nodes branching out from the root node and appearing at levels below such root node. In a grossly simplified example as compared with a typical directed graph, which may have thousands of nodes or more, the directed graph 10 of FIG. 2 has a root node 12, a pair of child nodes 12a, 12b, at a second level, and child node 12a has a child node 12aa at a third level. As seen, node 12 is of type 0, node 12a is of type 1, and nodes 12aa and 12b are of type 2. Of course, the directed graph 10 may have any particular structure without departing from the spirit and scope of the present invention. Directed graphs 10 are generally known or should be apparent to the relevant public and therefore need not be described herein in any detail.

With the directed graph 10 shown in FIG. 2, a traversal thereof, typically begins at the root node 12 and then may proceed to child node 12a. Since node 12a has a child (node 12aa), and bearing in mind that child nodes are typically dealt with prior to siblings, traversal then proceeds to child node 12aa, and then to node 12b. Since node 12b has no children and is the last child of node 12 to be dealt with, the traversal is then complete.

Figure 3:
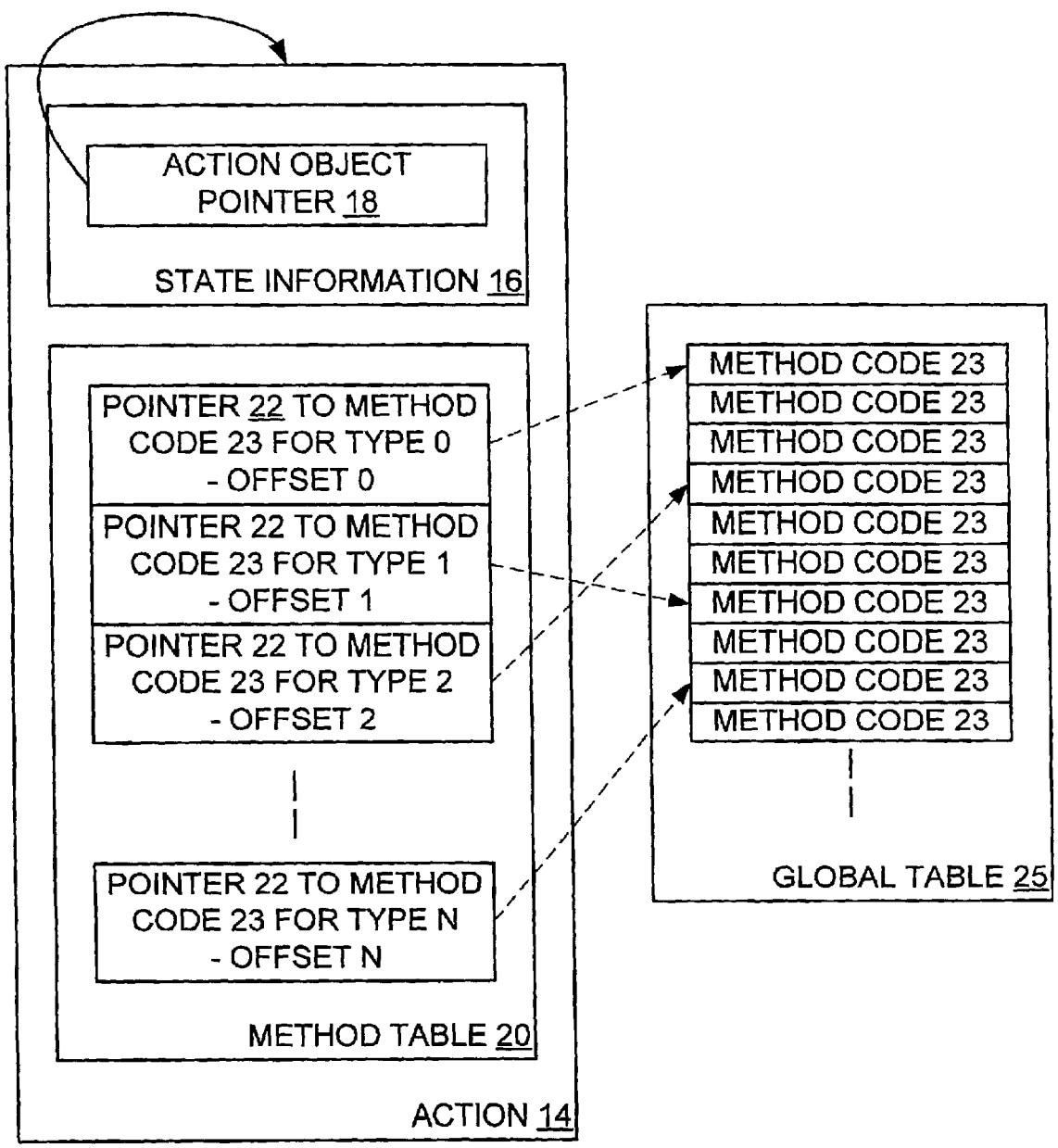
FIG. 3 is a block diagram showing the structure of an action such as that which may be applied to the directed graph of FIG. 2.

Referring now to FIG. 3, a representation of the data structure of an action 14 is shown. As may be appreciated, the action 14 may be the basis of a traversal of a directed graph such as that shown in FIG. 2. The action 14 shown in FIG. 3 and all other actions 14 shown in the various drawings may be any appropriate actions 14 without departing from the spirit and scope of the present invention. For example, each action 14 may be a draw action for drawing viewable objects based on a directed graph, a cull view action for culling objects to be drawn based on a particular point of view, a cull size action for culling objects to be drawn based on granularity, a cull semantic action for culling objects to be drawn based on object attributes, a count action for counting various aspects of a directed graph, a print action for printing various details about a directed graph, or the like. Actions 14 are generally known or should be apparent to the relevant public and therefore need not be described herein in excessive detail.

As shown, the action 14 is an object or the like that includes various state information 16 including an action object pointer 18, and a method table 20 including various methods to be performed as represented by a pointer 22 for each type of node in a directed graph being traversed, where each pointer 22 points to the corresponding method code 23. In the present disclosure, 'action' refers to the action object 14 unless circumstances dictate otherwise. Typically, although not necessarily, the method code is stored in a global table 25. As may be appreciated, the method table 20 may be separate from the object of the action 14 (not shown), in which case the action 14 includes a method table pointer pointing to the separate method table. As may also be appreciated, the method code may be included within the method table 20 (not shown).

During traversal of a directed graph 10 such as that shown in FIG. 2, for each node 12, etc., and as discussed above, the node type thereof defines which method code is executed in connection with the action 14 with respect to such node 12, etc. For example, since node 12b is of type 2, such value is employed as an offset within method table 20, and thus points at the third method code pointer 22 down (the first method code pointer 22 down being at offset 0). Accordingly, the method code 23 pointed to by the third method code pointer 22 down at offset 2 is employed with respect to performing the action 14 on node 12b, perhaps by way of a call or the like to such method code 23. As an example, a 'draw' action 14 traversing a graph 10 applies draw action methods to each container/node 12 therein. Thus, the draw action method code 23 for a 'Shape' container draws the shape's geometry using the appearance associated with that shape.

A method code call typically also includes other information including the action object pointer 18 from the state information 16. As seen in FIG. 3, the action object pointer 18 typically points to the action 14 itself. Thus, by passing the pointer 18 to the method code 23 during the call, the executing method code 23 knows the calling action 14. Among other things, the executing method code 23 may employ such pointer 18 to modify or examine variables contained within the state information 16 of the action 14.

In one embodiment of the present invention, the system 24 that supports the graph 10 is dynamically extensible both with regard to the containers 12 and actions 14. Thus, as new container types 26 (FIG. 7) are added, the method table 20 for each action 14 is dynamically re-sized to include a pointer 22 within such table 20 for the method code 23 corresponding to the new container type 26. As will be discussed in more detail below, a container type 26 may be an object or the like representative of a particular type of container, and has an index value or the like (i.e., 'container type' as used above) associated therewith.

Initializing and accessing each method table 20 for each action 14 requires that the system 24 maintain a run-time information library 28 for the actions 14, container types 26, and the like (collectively, 'system components') loaded into the system 24. The run-time information library 28 maintained within the system 24 contains an information object 30 to represent each currently available system component 14, 26, etc. As seen in FIG. 4, each information object 30 contains information about the corresponding system component 14, 26, etc., including a globally unique identifier, a type name (arm, elbow, ear, etc.), a system type (container, action, etc), a pointer to ancestor type information, a table information pointer for any derived types, and a pointer to a class factory which instantiates the type. Note that at least some of such information may be represented in the library 28 by pointers to other objects. As discussed in more detail below, all system components 14, 26, etc. are instantiated through a class factory which reads the corresponding information object 30 in the library 28 to initialize type information and/or update each existing action method table 20. The class factory is also the source for the actual method code 23 referenced by the method table 20 of each action 14.

Figure 5:
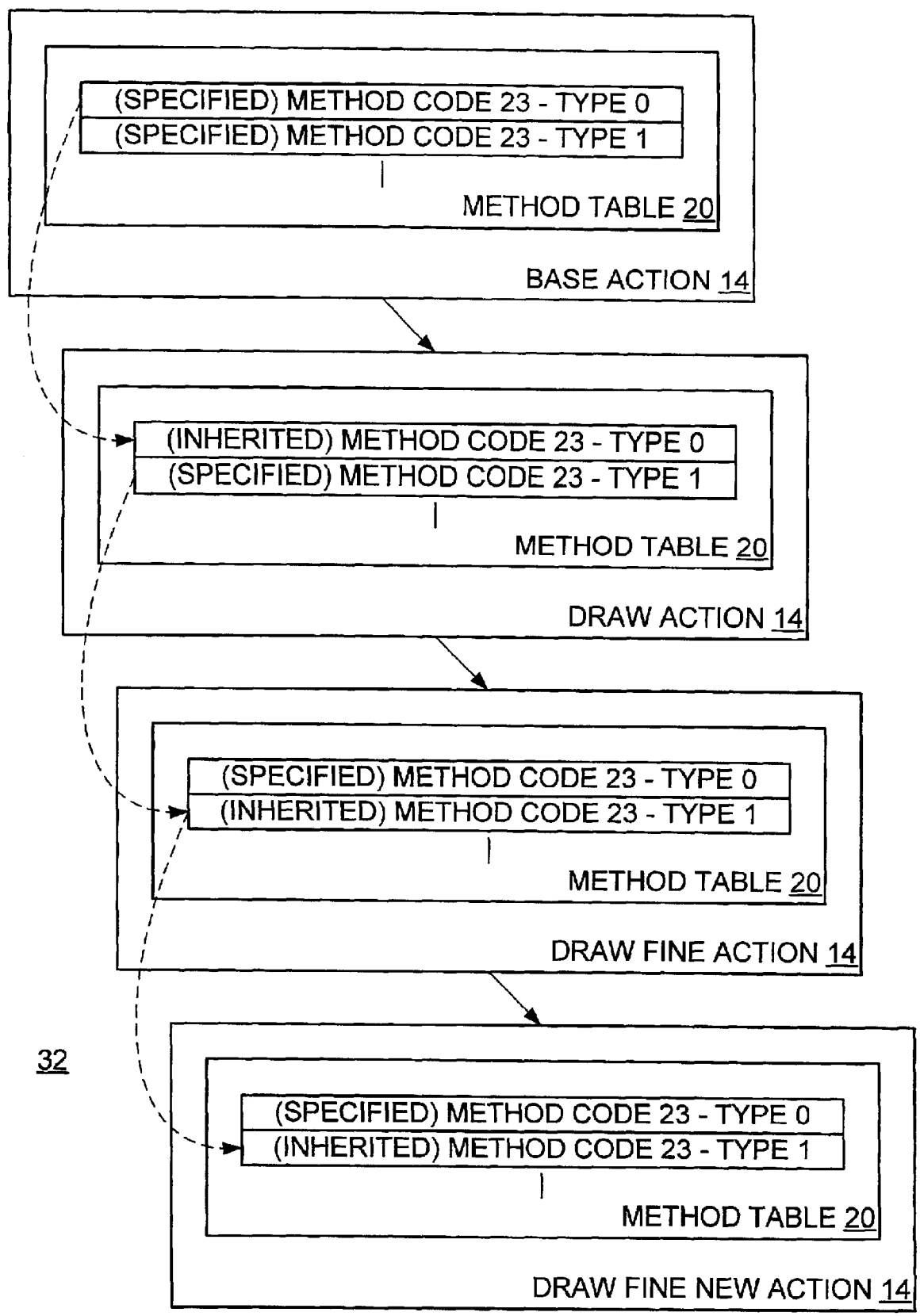
FIG. 5 is a block diagram showing a conceptual action tree having the action of FIG. 3 therein.

Referring now to FIG. 5, in one embodiment of the present invention, dynamic extensibility with regard to actions 14 is achieved by conceptually organizing all actions 14 of the system 24 in the form of an action tree 32 which branches out from a generalized base action 14 (at the top) to a plurality of more specific individual actions 14 (toward the bottom) at multiple levels of specificity. For example, and as seen, the general base action 14 at the top level leads to a more specific draw action 14 (among others) one level down, the more specific draw action 14 leads to an even more specific draw fine action 14 (among others) one level down, and the even more specific draw fine action 14 leads to the most specific draw fine new action 14 (among others) one level down. As will be appreciated, additional levels and other actions 14 in displayed levels within the tree 32 have been omitted for the sake of clarity. Of course, the action tree 32 may have any particular structure without departing from the spirit and scope of the present invention.

The conceptual action tree 32 is derivable from information objects 30 for the actions 14 as contained in the run-time information library 28 of the system 24. In particular, the ancestor action 14 (one level up) of a particular action 14 within the action tree 32, may be located by referencing the object 30 corresponding to the particular action 14, referencing ancestor pointer information within the referenced object 30, and employing such ancestor pointer information to find another object 30 corresponding to the ancestor action 14. Of course, the process may be repeated until the base action 14 is found. Of course, with the ancestor pointer information in each object 30 corresponding to an action 14, the system 24 can navigate the action tree 32 without actually constructing same.

In being organized from general to more specific, and in one embodiment of the present invention, the conceptual action tree 32 allows each action 14 to inherit action method code 23 for a particular container type 26 from an ancestor action 14 (above) in the event that the action 14 as defined does not specify such action method code 23 for such container type 26. Put another way, absent an action 14 having specified action method code 23 for a particular container type 26, such action 14 inherits action method code 23 for such particular container type 26 from an ancestor action 14. Thus, a designer designing a new action 14 for the system 24 need not necessarily specify method code 23 for every container type 26 with respect to such new action 14.

Instead, the designer may choose to specify method code 23 for only some of the container types 26 ((SPECIFIED) METHOD CODE in FIG. 5) with respect to the new action 14, and may position the new action 14 at a specific location within the action tree 32 so as to allow such new action 14 to inherit from the ancestor action 14 (one level up) the method code 23 for all other container types 26 not specified ((INHERITED) METHOD CODE in FIG. 5). Of course, such ancestor action 14 may not itself specify all the method code 23 for all other container types 26, but in turn may inherit some method code 23 from a previous generation ancestor action 14 (another level up), and so on. It would not be inconceivable, then, for a specific action 14 in the action tree 32 to employ method code 23 actually specified in and inherited from every level in the action tree 32 up to and including the base action 14. Note that pointers 22 to method code 23 are omitted from each action 14 in FIG. 5 for the sake of clarity only. Note also that the base action 14 must specify method code 23 for each container type 26, if only to allow derived actions 14 (at levels below) to inherit method code 23 when not specified therefor. Such specific method code 23 in the base action may of course be default or null code which effectuates little if any substantive result.

As mentioned above, based on the conceptual action tree 32, a designer can design a new action 14 for the system 24. This of course presumes that the designer is provided with the system 24 in a core form. Typically, a core system 24 provides the basic containers 26 (discussed below) required to describe a graph/scene and provides the basic actions 14 to be performed on the graph/scene. Such basic actions 14 may for example include drawing, computing bounds, and writing data to a file. Such basic containers 26 may for example include links, switches, and shapes such as bodies, arm, hands, fingers, etc. As should be appreciated, providing a core system 24 that is highly and dynamically extensible allows a designer to extend the system 24 to implement desired functionality for a particular application.

A designer may as an example choose to design a new action 14 for the system 24 to support a new low-level graphics interface such as that which is necessary when a new version of a product is released. Assuming that most actions 14 would not make calls to the low-level interface, such actions 14 need not be changed. A Draw action 14, however, must be enhanced to support the new interface. With the present invention, the existing Draw action 14 and the core of the system 24 need not be modified. Instead, it is only necessary to create a new Draw action 14 ('DrawNew') that has as its ancestor the existing Draw action 14. The DrawNew action 14 may be packaged in its own library and shipped separately from the core of the system 24.

In implementing the DrawNew action 14, and as discussed above, traversal of many container types 26 does not require making calls to the new interface and thus such DrawNew action 14 should handle such container types 26 in the same manner as the Draw action 14. Accordingly, the DrawNew action 14 should inherit the method code 23 for handling such container types 26 from the Draw action 14. For example, drawing a switch node simply involves reading state in the node and based on that state deciding which child to traverse. Since the DrawNew action 14 should behave the same as the Draw action 14 with regard to the switch node, then, the DrawNew action 14 should inherit the method code 23 corresponding to the switch node from the Draw action 14.

For other container types 26, however, custom traversal by the DrawNew action 14 is required. For example, a shape node contains shape information to be drawn. Assuming the new interface has some more efficient mechanisms for drawing the shape represented by the shape node, the DrawNew action 14 should specify new method code 23 corresponding to the shape node and should not merely inherit corresponding method code 23 from the Draw action 14.

Figure 6:
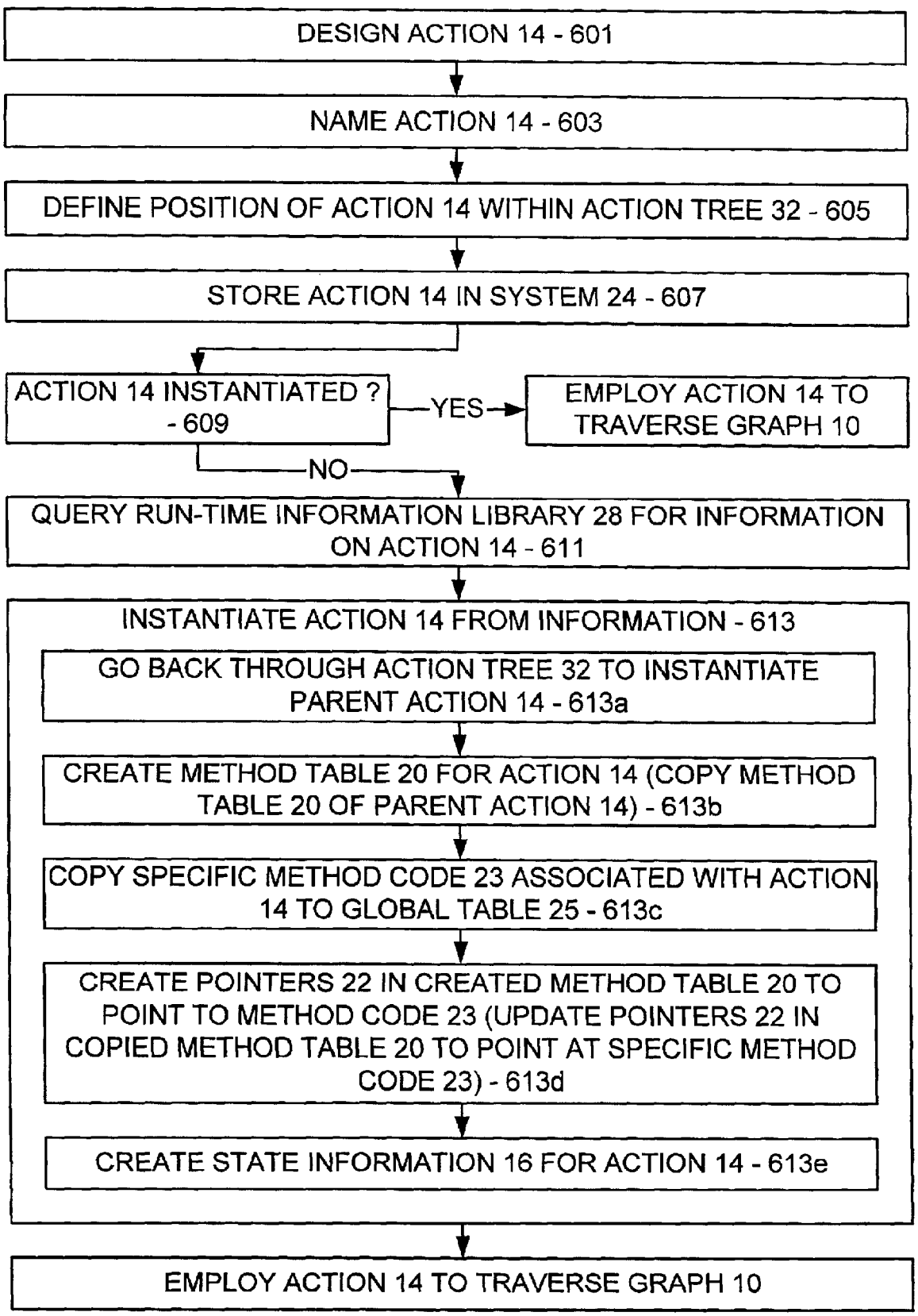
FIG. 6 is a flow diagram showing steps performed in creating and instantiating the action of FIG. 3 in accordance with one embodiment of the present invention.

In one embodiment of the present invention, and referring now to FIG. 6, a new action 14 is added to the system 24 according to the following:

Preliminarily, the designer designing the new action 14 determines the functionality to be imparted based on the action and thus defines specific method code 23 to be performed by the new action 14 with regard to at least some of the container types 26 in the system (step 601). The designer also gives the new action 14 a name (step 603), and defines the place of the new action 14 within the action tree 32 by identifying the immediate ancestor action 14 for the new action 14 (i.e., the action 14 one level up from the new action 14 and from which the new action 14 'hangs') (step 605). The designer may of course define additional information with regard to the new action 14 without departing from the spirit and scope of the present invention. The new action 14 as thus constructed and defined is then stored in the system 24 (step 607).

Note that storing the new action 14 in the system 24 may be performed in any appropriate manner without departing from the spirit and scope of the present invention. For example, the new action 14 may be stored as a class available to a class factory. Importantly, appropriate information regarding the action 14 is stored in the run-time information library 28 in an appropriately configured information object 30 to represent the new action 14, as shown in FIG. 4. The method code 23 specific to the new action 14 need not be stored in the global table 25 (FIG. 3), especially if the global table 25 is not persistent. Instead, such method code 23 will be stored in the global table 25 when the action 14 is instantiated (see below). Note that at this time no actual object for the new action 14, including state information 16 and a method table 20, has as yet been instantiated. The new action 14 as constructed and defined but not instantiated is thus available to be called upon by an application during an application run-time session to traverse a graph 10.

In one embodiment of the present invention, each action 14 is not instantiated in the system 24 at run-time until the action 14 is actually needed. Notably, an action 14 may be needed not only for traversing a graph 10, but for instantiating another action 14 that is in turn needed to traverse a graph 10. That is, because an action 14 to be employed may inherit method code 23 from one or more generations of ancestor actions 14, instantiation of an action 14 should include instantiation of such ancestor action(s) 14. All actions 14 that supply inherited method code 23 to the to-be-employed action 14 should therefore be instantiated in the course of instantiating the to-be-employed action 14. Since each action 14 is presumably positioned in the action tree 32 to inherit at least some method code 23 from an ancestor action 14, all actions 14 should therefore be instantiated in the line of ancestry between the base action and the to-be-employed action 14.

Typically, as long as the ancestor (parent) action 14 of the to-be-employed action 14 (i.e., one level up) is instantiated, all inherited method code 23 is indeed available to such to-be-employed action 14. Of course, it may be necessary to instantiate the next ancestor (grandparent) action 14 (i.e., another level up) to instantiate the ancestor (parent) action 14, it may be necessary to instantiate the great-grandparent action 14 to instantiate the grandparent action 14, etc.

In one embodiment of the present invention, and as seen in FIG. 2, the system 24 includes a run-time action table 34 that maintains a list of all actions 14 instantiated in the system 24. Accordingly, an application that intends during run-time to call upon an action 14 to traverse the graph 10 first determines from the run-time action table 34 whether the action 14 is instantiated (step 609). If so, the application proceeds to employ the action 14 to traverse the graph 10.

However, if the action 14 is not instantiated, the system 24 queries the run-time information library 28 for information on the action 14 (step 611) and from such information instantiates the action 14 (step 613). In particular, based on information on the action 14 in the run-time information library 28, the system 24 goes back through the action tree 32 from the instantiating action 14 to the base action 14 as far back as is necessary and ensures that all intervening actions 14 are instantiated and especially that the parent action 14 to the instantiating action 14 is instantiated (step 613a). That is, the system 24 instantiates each such ancestor action 14 as necessary in the manner discussed herein so that the parent action 14 in particular is instantiated.

Thereafter, the system 24 creates a method table 20 for the instantiating action 14 (step 613b), copies specific method code 23 associated with the action 14 to the global table 25 (step 613c), and appropriately creates pointers 22 in the created method table 20 which respectively point to method code 23 in the global table 25 (step 613d). Note that since the instantiating action 14 may inherit much if not most of the pointers 22/method code 23 from the parent action 14 thereof (i.e., one level up), and since the pointers 22/method code 23 are indexed by container type 26, creating the method table 20 (step 613b) may comprise copying the method table 20 of the parent action 14 and employing the copied method table 20 as the method table 20 of the instantiating action 14, and creating the pointers 22 (step 613d) may comprise updating appropriate ones of the pointers 22 in the copied method table 20 to point at the specific method code 23 associated with the instantiating action 14 based on information obtained from the run-time information library 28. The process is similar if each method table 20 includes the method code 23 and not the pointers 22.

Finally, as part of instantiating the action 14, the system 24 creates state information 16 for the action 14 as necessary and appropriate (step 613e). Details on creating such state information 16 should be known or apparent to the relevant public and therefore need not be discussed herein in any detail. The action 14 as thus instantiated is now ready and available for being employed by the system 24 to traverse the graph 10.

Figure 7:
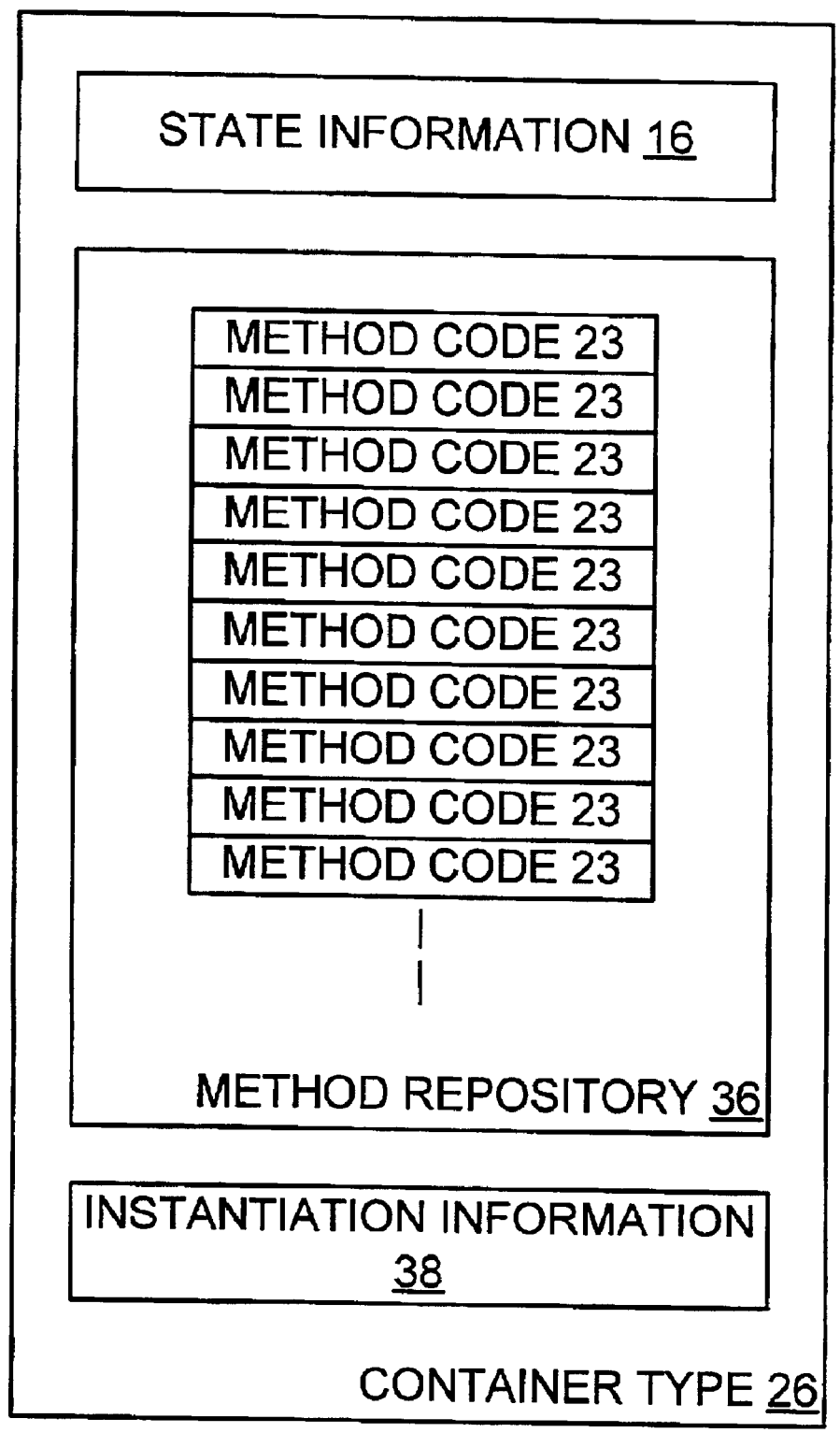
FIG. 7 is a block diagram showing the structure of a container type such as that which may be employed to instantiate a container in the directed graph of FIG. 2.

Thus far, the present invention has been discussed in terms of adding actions 14 to the system during run-time. Significantly, the present invention also encompasses adding container types 26 at run-time. Referring now to FIG. 7, a representation of the data structure of a container type 26 is shown. As may be appreciated, a container type 26 is the basis for instantiating each container 12 in the graph 10 as shown in FIG. 2. The container type 26 shown in FIG. 7 may be any appropriate container type 26 without departing from the spirit and scope of the present invention. For example, the container type 26 may represent a graph element such as a base container, a link, or a switch, may represent a visual element such as a shape, a wall, an arm, or a finger, or the like. Container types 26 are generally known or should be apparent to the relevant public and therefore need not be described herein in any detail. As with the actions 14, and as noted above, each container type 26 is represented as an information object 30 in the run-time information library 28 of the system 24.

As shown, the container type 26 is an object or the like that includes various state information 16, as with an action 14, and a method repository 36 including method code 23 for one or more specified methods to be performed by at least some of the instantiated actions 14 on containers 12 instantiated from the container type 26. The container type method repository 36 may alternately employ pointers pointing to the method code stored in another location. The method repository 36 may also be separate from the object of the container type 26 (not shown), in which case the container type 26 includes a method repository pointer pointing to the separate method repository 36.

Significantly, each piece of method code 23 in the method repository 38 is associated with at least one particular action 14, and is added to the method table 20 of such action 14 (by way of an appropriate pointer 22) prior to employing such action 14 to traverse the graph 10. Thus, the action 14 has the associated method code 23 of the container type 26 available thereto in the event that the action 14 encounters a container 12 instantiated from the container type 26 during traversal of the graph 10. Any appropriate mechanism for associating each piece of method code 23 with an action 14 may be employed without departing from the spirit and scope of the present invention.

Also significantly, the container type 26 differs from the action 14 in that the container type 26 includes (or points to) instantiation information 38 for instantiating a container 12 of the type of the container type 26. Such instantiation information 38 of course varies depending on the container type 26 and what is necessary to define a container 12 of the type of the container type 26. In general, such instantiation information 38 may be any appropriate information without departing from the spirit and scope of the present invention. Such instantiation information 38 is known or should be apparent to the relevant public and therefore need not be described herein in any detail.

With the container type 26 as shown in FIG. 7 and discussed above, and in one embodiment of the present invention, dynamic extensibility with regard to container types 26 is achieved by checking for new container types 26 each time an action 14 is to be employed to traverse the graph 10, and if so extending the method table 20 of the action 14 to include a new pointer 22 therein for the new container type 26. In one embodiment of the present invention, and as seen in FIG. 2, the system 24 contains a count 40 of all container types 26. Upon the presence of each new container type 26, then, such new container type 26 is associated with the next available index value based on the count 40, and the count 40 is appropriately incremented. Further, it is determined whether an action 14 must extend and update its method table 20 by comparing the count 40 of container types with the number of entries in the method table 20. For example, if an action 14 has a method table 20 with entries up to index number 20 and the count 40 is at index number 24, the action 14 is missing 4 entries in its method table 20 and same must be expanded to accommodate the 4 missing entries. Note in calculating the number of missing entries if any, appropriate consideration must be taken as to whether indexing of container types 26 starts at 0 or 1.

Note that in designing a new container type 26, a designer may and most likely will choose to specify method code 23 for only some of the actions 14. Thus, in the case where an action 14 does not have such method code 23 specified, such action 14 will inherit from an ancestor action 14 specific method code 23 with respect to the new container type 26. Correspondingly, and in the case where an action 14 does in fact have such method code 23 specified, a child action 14 of such action 14 will inherit such method code 23 absent other method code 23 being specified therefor with regard to the new container type 26.

A designer may choose to design a new container type 26 for the system 24 to implement containers 12 that have certain structural attributes. For example, consider the case of a new container type 26 named RandomSwitch which has the functional attribute that traversal of a container 12 instantiated therefrom by at least some actions 14 causes a random selection of one of the child containers 12 of such instantiated container 12 to be traversed. In this example, the traversal behavior for the RandomSwitch container type 26 is the same for many actions 14. That is, a Draw action 14 (FIG. 5) traverses the instantiated RandomSwitch container 12 in the same way as a Bound action 14, a Cull action 14, etc. In fact, the traversal behavior may be specified by the designer to be the same for all actions 14, in which case the designer of the RandomSwitch container type 26 would specify method code 23 to be associated with the base action 14 only. Consequently, such specified method code 23 would be inherited by all actions 14 in the action tree 32 of FIG. 5.

Notably, the present invention allows that a new container type 26 may be designed to implement new traversal behavior for one or more actions 14 already present in the system 24, and such new container type 26 can be shipped in a separate library and incorporated within the system 24 at run-time. Accordingly, the designer of the new container type 26 need not re-compile the system 24 to include the new container type 26. Moreover, because actions 14 in the system 24 inherit method code 23, the new container type 26 can affect the traversal behavior of actions 14 added to the system 24 both before and after the new container type 26 is added, again without the need to re-compile the system 24 to incorporate the new traversal behavior.

Figure 8:
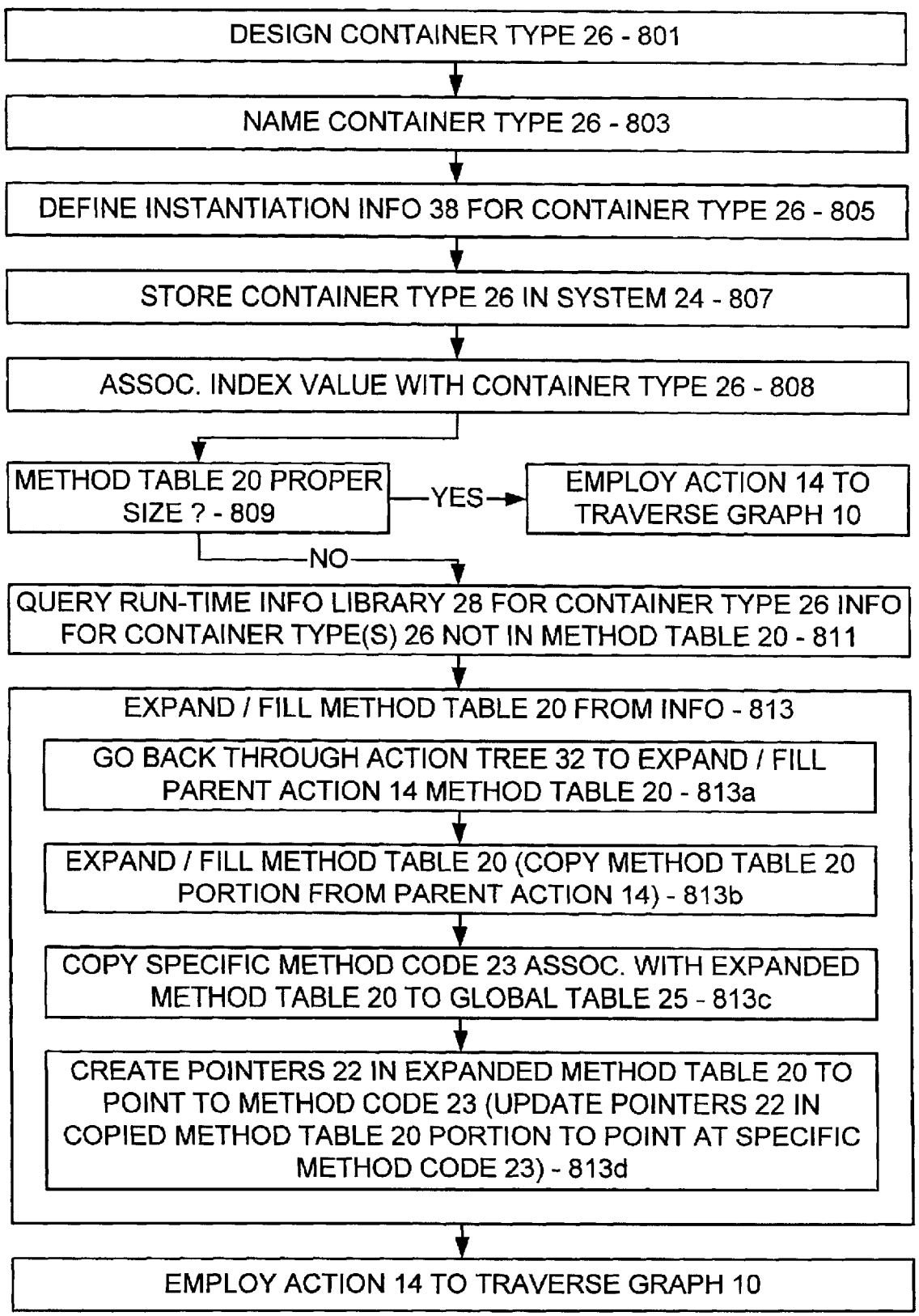
FIG. 8 is a flow diagram showing steps performed in creating the container type of FIG. 7 and expanding and filling in the action of FIG. 3 based on such container type in accordance with one embodiment of the present invention.

In one embodiment of the present invention, and referring now to FIG. 8, a new container type 26 is added to the system 24 according to the following:

Preliminarily, the designer designing the new container type 26 determines the structural behavior to be imparted based on a container 12 instantiated from the new container type 26 and thus defines specific method code 23 to be performed by at least some existing actions 14 with regard to the instantiated container 12 (step 801). The designer also gives the new container type 26 a name (step 803), and defines any instantiation information 38 necessary for instantiating containers 12 based on the new container type 26 (step 805). The designer may of course define additional information with regard to the new container type 26 without departing from the spirit and scope of the present invention. The new container type 26 as thus constructed and defined is then stored in the system 24 (step 807).

Note that storing the new container type 26 in the system 24 may be performed in any appropriate manner without departing from the spirit and scope of the present invention. For example, and as with a new action 14, the new container type may be stored as a class available to a class factory. Importantly, appropriate information regarding the new container 26 is stored in the run-time information library 28 in an appropriately configured information object 30 to represent the new container type 26, as shown in FIG. 4. Significantly, in storing the information on the container type 26 in the run-time information library 28, the system 24 associates an index value with the container type 26 in a manner such that the container type 26 may be looked up based on the associated index value (step 808).

Also as with a new action 14, the method code 23 specific to the new container type 26 need not be stored in the global table 25 (FIG. 3), especially if the global table 25 is not persistent. Instead, such method code 23 with regard to a particular action 14 will be stored in the global table 25 when the method table 20 of the action 14 is expanded and filled in to take into account the new container type 26 (see below). Note that at this time no method table 20 of any action 14 has in fact been expanded and filled in to take into account the new container type 26.

In one embodiment of the present invention, the method table 20 of each action 14 is expanded and filled in to take into account the new container type 26 only when the action 14 is actually needed. Notably, the method table 20 of an action 14 may need to be expanded and filled in not only for traversing a graph 10, but for expanding and filling in the method table 20 of another action 14 that is in turn needed to traverse a graph 10. As before, because an action 14 to be employed may inherit method code 23 from one or more generations of ancestor actions 14, expansion and filling in of the method table 20 of an action 14 should include expansion and filling in of the method table 20 of such ancestor action(s) 14. All actions 14 that supply inherited method code 23 to the to-be-employed action 14 should therefore have their method tables 20 expanded and filled in in the course of expanding and filling in the method table 20 of the to-be-employed action 14. Typically, and as before, as long as the method table 20 of the ancestor (parent) action 14 of the to-be-employed action 14 (i.e., one level up) is expanded and filled in, all inherited method code 23 for a new container type 26 is indeed available to such to-be-employed action 14.

As discussed above and as seen in FIG. 2, the system 24 includes a count 40 of all container types 26 in the system 24. Accordingly, in one embodiment of the present invention, an application that intends during run-time to call upon an action 14 to traverse the graph 10 first determines whether the action 14 has a method table 20 of proper size based on the count 40 (step 809). In particular, it is determined by comparing the count 40 with the number of entries in the method table 20 whether such method table 20 is the proper size based on such count 40. If so, the application proceeds to employ the action 14 to traverse the graph 10.

However, if the action 14 does not have a proper-size method table 20 based on the count, the system 24 queries the run-time information library 28 for information on each container type 26 not represented in the method table 20 of the action 14 (step 811) and from such information expands and fills in such method table 20 of such action 14 (step 813). In particular, and recalling that each container type 26 in the run-time information library 28 is associated with an index value (at step 808), the system 24 determines which container types 26 are not represented in the method table 20 of the action, obtains appropriate information for each non-represented container type 26, and based on such information updates the method table 20 of the action 14 (hereinafter the action 14 of interest). For example, if the count 40 is at 139 and the method table has 136 entries therein, and assuming that the difference thereof (3) represents the number of entries that must be added to the method table 20 of the action 14 of interest, the system obtains and employs information on the 3 latest container types based on their index values as noted in the run-time information library 28.

In particular, based on information on the action 14 in the run-time information library 28, the system 24 goes back through the action tree 32 from the action 14 of interest to the base action 14 as far back as is necessary and ensures that the respective method tables 20 of all intervening actions 14 are expanded and filled in and especially that the method table 20 of the parent action 14 to the action 14 is expanded and filled in (step 813a). That is, the system 24 expands and fills in the method table 20 of each such ancestor action 14 as necessary in the manner discussed herein so that the parent action 14 in particular is expanded and filled in.

Thereafter, the system 24 expands the method table 20 of the action 14 of interest (step 813b), copies specific method code 23 associated with the expanded portion of the method table 20 of the action 14 of interest to the global table 25 (step 813c), and appropriately fills in the expanded portion of the method table 20 with pointers 22 which respectively point to method code 23 in the global table 25 (step 813d). Note that since the expanded portion of the method table 20 of the action 14 of interest may inherit much if not most of the pointers 22/method code 23 from the parent action 14 thereof (i.e., one level up), and since the pointers 22/method code 23 are indexed by container type 26, expanding the method table 20 (step 813b) may comprise copying the corresponding portion of the method table 20 of the parent action 14 and employing the copied portion of the method table 20 as the expanded portion of the method table 20 of the action 14 of interest, and creating the pointers 22 (step 813d) may comprise updating appropriate ones of the pointers 22 in the copied method table 20 to point at the specific method code 23 associated with the action 14 of interest based on information obtained from the run-time information library 28. The process is similar if each method table 20 includes the method code 23 and not the pointers 22.

Thus far, the present invention has been discussed in terms of either adding an action 14 or adding a container type 26 to the system during run-time. As may be appreciated, in either case, when an action 14 is to be employed to traverse the graph 10, the method table 20 of such action 14 is at issue and is either instantiated/created along with the action 14 (when an action 14 is added as in FIG. 6), or is expanded and filled in (when a container type 26 is added as in FIG. 8). Significantly, it may very well be the case that both an action 14 and a container type 26 are added during run-time. In such situation, when the added action 14 is to be employed to traverse the graph 10, the method table 20 of such action 14 is both created (FIG. 6) and expanded and filled in (FIG. 8).

Figure 9:
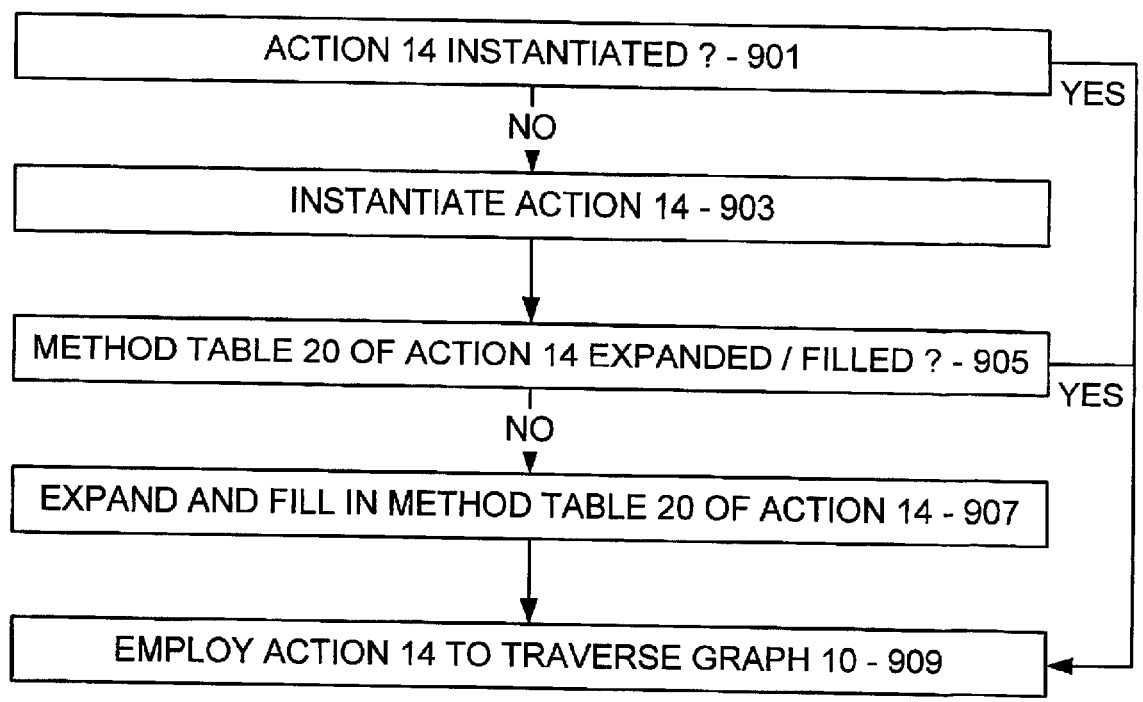
FIG. 9 is a flow diagram showing steps performed in examining the action of FIG. 3 prior to employing the action to traverse the directed graph of FIG. 2 in accordance with one embodiment of the present invention.

More generally, then, and referring not to FIG. 9, every time an action 14 is to be employed in the system 24 to traverse the graph 10, the system 24 first checks to see whether the action 14 must be instantiated (step 901). If so, the action 14 is instantiated according to FIG. 6 (step 903). Thereafter, the system then checks to see whether the method table 20 of the action 14 must be expanded and filled in (step 905). If so, the method table 20 of the action 14 is in fact expanded and filled in according to FIG. 8 (step 907). Thereafter, the action 14 is available for being employed to traverse the graph 10. (step 909).

Note that the present invention has heretofore been discussed in terms of inheritance based on position within the conceptual action tree 32 of FIG. 5. Importantly, a designer of an action 14 may program any other arbitrarily complex inheritance behavior without departing from the spirit and scope of the present invention. For example, an action 14 could query for the state of the system 24 and do custom inheritance based on such queried state.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism for applying multiple actions to a directed graph in a single traversal of such directed graph. In particular, the present invention comprises a method and mechanism for extending the functionality of the core system, whereby new container types may be added and yet work with existing actions without having to re-develop such actions, and also whereby new actions may be added and yet work with existing container types without having to re-develop such container types.

With such extension mechanism, the system can take on additional functionality as required. For example, the system can implement new hardware and software features and algorithms, and can support new hardware and software, all without the system being upgraded to a new version. The system thus has a high degree of fine-grained extensibility to for example allow hardware vendors to replace particular behaviors of objects and to allow software developers and customers to replace and extend algorithms where they have more knowledge to achieve their own differentiation and superior results.

It should be appreciated that changes could be made to the embodiments described above without departing from the inventive concepts thereof. For example, the actions 14 and container types 26 may each be embodied in any appropriate structural form, such as in one object or the like or across multiple objects or the like. It should be understood, therefore, that this invention is not limited to the particular embodiments disclosed, but it is intended to cover modifications within the spirit and scope of the present invention as defined by the appended claims.

What is claimed is:

1. A computer-readable medium having computer-executable instructions thereon for implementing a system having:
a plurality of actions available for traversing a directed graph, the directed graph including a plurality of containers, each container having a type value and being instantiated based on one of a plurality of container types, each action including an action method table comprising a plurality of action methods, each action when traversing the directed graph employing the type value of an encountered container as an offset into the action method table thereof to select the action method to be executed on the encountered container; and
a run-time information library which includes a plurality of information objects, each information object representing one of an action and a container type,
wherein each information object represents an action includes information necessary to instantiate the action at run-time.

2. The medium of claim 1 wherein each information object in the implemented system contains information about the represented action or container type including members of a group consisting of a globally unique identifier, a type name, a system type, a pointer to ancestor type information, a table information pointer for any derived types, a pointer to a class factory which instantiates the type, and combinations thereof.

3. The medium of claim 1 wherein each information object representing a container type includes information necessary to instantiate a container based on the container type at run-time.

4. The medium of claim 1 wherein each information object representing a container type includes information necessary to expand and fill in the action method table of each action at run-time such that a container instantiated based on the container type may be handled when encountered by each action when traversing the directed graph.

5. A computer-readable medium having computer-executable instructions thereon for implementing a method in combination with a system having a plurality of actions available for traversing a directed graph, the directed graph including a plurality of containers, each container having a type value and being instantiated based on one of a plurality of container types, each action as instantiated including an action method table comprising a plurality of action methods, each action when traversing the directed graph employing the type value of an encountered container as an offset into the action method table thereof to select the action method to be executed on the encountered container, the method for instantiating an action during run-time, the instantiating action depending from a parent action, the implemented method comprising:

querying a run-time information library for information on the instantiating action, the information including the parent action of the instantiating action and the specific action methods associated with the instantiating action; and instantiating the action based on such information by:

ensuring that the parent action to the instantiating action is instantiated;

copying the action method table of the parent action and employing the copied action method table as the action method table of the instantiating action; and updating appropriate ones of the action methods in the copied method table to be the specific action methods associated with the instantiating action based on the information obtained from the run-time information library, wherein at least some of the action methods in the action method table of the instantiating action are not updated and thus are action methods inherited from the parent action.

6. The medium of claim 5 wherein the system further has a global table including the action methods associated with the instantiated actions, and wherein the action method table of each action comprises a plurality of pointers pointing to the action methods in the global table, each action when traversing the directed graph employing the type value of an encountered container as an offset into the action method table thereof to select the pointer to the action method in the global table to be executed on the encountered container, the implemented method comprising:

copying the specific action methods associated with the instantiating action to the global table; and updating appropriate ones of the pointers in the copied action method table to point at the specific action methods associated with the instantiating action based on the information obtained from the run-time information library, wherein at least some of the pointers in the action method table of the instantiating action are not updated and thus are pointed at action methods inherited from the parent action.

7. The medium of claim 5 wherein the system further has a run-time action table maintaining a list of all actions instantiated in the system, the implemented method further comprising first determining from the run-time action table that the action is not instantiated.

8. The medium of claim 5 wherein the actions in the system are organized into an action tree which branches out from a generalized base action to a plurality of more specific actions at multiple levels of specificity, each non-base action directly depending from a parent action based on the action tree, and wherein ensuring that the parent action to the instantiating action is instantiated comprises going back through the action tree from the instantiating action to the base action as far back as is necessary to ensure that the parent action to the instantiating action is instantiated.

9. A computer-readable medium having computer-executable instructions thereon for implementing a method in combination with a system having a plurality of actions available for traversing a directed graph, the directed graph including a plurality of containers, each container having a type value and being instantiated based on one of a plurality of container types, each action as instantiated including an action method table comprising a plurality of action methods, each action when traversing the directed graph employing the type value of an encountered container as an offset into the action method table thereof to select the action method to be executed on the encountered container, the method for developing a new action to be instantiated during run-time, the new action for imparting a particular functionality, the implemented method comprising:

defining a parent action for the new action to depend from based on the particular functionality to be imparted;

defining specific action methods to be performed by the new action with regard to at least some of the container types in the system based on the functionality to be imparted and thereby at least implicitly designating action methods to be inherited by the new action from the parent action, the inherited action methods to be performed by the new action with regard to the other container types in the system; and storing the new action including the defined parent action and defined specific action methods a form to be retrieved by the system during run-time.

10. The medium of claim 9 wherein storing the new action comprises storing the new action as a class available to a class factory.

11. A computer-readable medium having computer-executable instructions thereon for implementing a method in combination with a system having a plurality of actions available for traversing a directed graph, the directed graph including a plurality of containers, each container having a type value and being instantiated based on one of a plurality of container types, each action as instantiated including an action method table comprising a plurality of action methods, each action when traversing the directed graph employing the type value of an encountered container as an offset into the action method table thereof to select the action method to be executed on the encountered container, the implemented method for expanding and filling in the action method table of an action ('action of interest') during run-time upon determining that at least one container type has been added to the system, the action of interest depending from a parent action, the implemented method comprising:

determining how many new container types have been added;

expanding the action method table of the action of interest a corresponding number of entries;

querying a run-time information library for information on each added container type and the action of interest, the information including the parent action of the action of interest and a specific action method of each added container type if any with regard to the action of interest; and filling in the expanded entries of the action method table of the action of interest based on such information by:

ensuring that the parent action to the action of interest is expanded and filled in;

copying the corresponding entries from the action method table of the parent action and employing the copied entries as the corresponding entries in the action method table of the action of interest; and updating appropriate ones of the action methods in the copied entries in the action method table to be the specific action methods associated with the added container types if any based on the information obtained from the run-time information library, wherein action methods in the copied entries of the action method table of the action of interest that are not updated are action methods inherited from the parent action.

12. The medium of claim 11 wherein the implemented method further comprises determining that a container type has been added to the system.

13. The medium of claim 12 wherein determining that a container type has been added to the system comprises obtaining a count of all container types in the system and determining whether the action method table of the action of interest has a proper size based on the count.

14. The method of claim 11 wherein the system further has a global table including the action methods associated with the instantiated actions, and wherein the action method table of each action comprises a plurality of pointers pointing to the action methods in the global table, each action when traversing the directed graph employing the type value of an encountered container as an offset into the action method table thereof to select the pointer to the action method in the global table to be executed on the encountered container, the implemented method comprising:

copying the specific action methods associated with the added container types if any to the global table; and updating appropriate ones of the pointers in the copied entries of the action method table to point at the specific action methods associated with the added container types based on the information obtained from the run-time information library, wherein at least some of the pointers in the action method table of the action of interest are not updated and thus are pointed at action methods inherited from the parent action.

15. The medium of claim 11 wherein the actions in the system are organized into an action tree which branches out from a generalized base action to a plurality of more specific actions at multiple levels of specificity, each non-base action directly depending from a parent action based on the action tree, and wherein ensuring that the action method table of the parent action to the action of interest is expanded and filled in comprises going back through the action tree from the action of interest to the base action as far back as is necessary to ensure that the action method table of the parent action to the action of interest is expanded and filled in.

16. A computer-readable medium having computer-executable instructions thereon for implementing a method in combination with a system having a plurality of actions available for traversing a directed graph, the directed graph including a plurality of containers, each container having a type value and being instantiated based on one of a plurality of container types, each action as instantiated including an action method table comprising a plurality of action methods, each action when traversing the directed graph employing the type value of an encountered container as an offset into the action method table thereof to select the action method to be executed on the encountered container, the method for developing a new container type to be added to the system during run-tune, the new container type for imparting a particular structure, the implemented method comprising:

defining structural behavior to be imparted based on a container instantiated from the new container type;

defining specific action methods to be performed by at least some existing actions with regard to the container instantiated from the new container type and thereby at least implicitly designating action methods to be inherited by existing actions from respective parent actions with regard to the new container type in the system; and storing the new container type including the defined structural behavior and defined specific action methods in a form to be retrieved by the system during run-time.

17. The medium of claim 16 wherein storing the new action comprises storing the new container type as a class available to a class factory.

18. A computer-readable medium having computer-executable instructions thereon for implementing a method in combination with a system having a plurality of actions available for traversing a directed graph, the directed graph including a plurality of containers, each container having a type value and being instantiated based on one of a plurality of container types, each action as instantiated including an action method table comprising a plurality of action methods, each action when traversing the directed graph employing the type value of an encountered container as an offset into the action method table thereof to select the action method to be executed on the encountered container, the implemented method for checking an action during run-time and prior to traversing the directed graph therewith and comprising:

determining whether the action must be instantiated;

instantiating the action during run-time if the action is not in fact instantiated;

determining whether the action method table of the action must be expanded and filled in based on any new container types in the system;

expanding and filling in the action method table of the action during run-time if the action method table of the action must in fact be expanded and filled; and employing the action to traverse the directed graph.

19. The medium of claim 18 wherein the action depends from a parent action, and wherein instantiating the action comprises:

querying a run-time information library for information on the instantiating action, the information including the parent action of the instantiating action and the specific action methods associated with the instantiating action; and instantiating the action based on such information by:

ensuring that the parent action to the instantiating action is instantiated;

copying the action method table of the parent action and employing the copied action method table as the action method table of the instantiating action; and updating appropriate ones of the action methods in the copied method table to be the specific action methods associated with the instantiating action based on the information obtained from the run-time information library, wherein at least some of the action methods in the action method table of the instantiating action are not updated and thus are action methods inherited from the parent action.

20. The medium of claim 18 wherein the action depends from a parent action, and wherein expanding and filling in the action method table of the action comprises:

determining how many new container types have been added;

expanding the action method table of the action of interest a corresponding number of entries;

querying a run-time information library for information on each added container type and the action of interest, the information including the parent action of the action of interest and a specific action method of each added container type if any with regard to the action of interest; and filling in the expanded entries of the action method table of the action of interest based on such information by:

ensuring that the parent action to the action of interest is expanded and filled in;

copying the corresponding entries from the action method table of the parent action and employing the copied entries as the corresponding entries in the action method table of the action of interest; and updating appropriate ones of the action methods in the copied entries in the action method table to be the specific action methods associated with the added container types if any based on the information obtained from the run-time information library, wherein action methods in the copied entries of the action method table of the action of interest that are not updated are action methods inherited from the parent action.

* * * * *